Oct. 15, 1929.  E. N. GOTT  1,731,531
AIRCRAFT
Filed Nov. 14, 1928  2 Sheets-Sheet 2

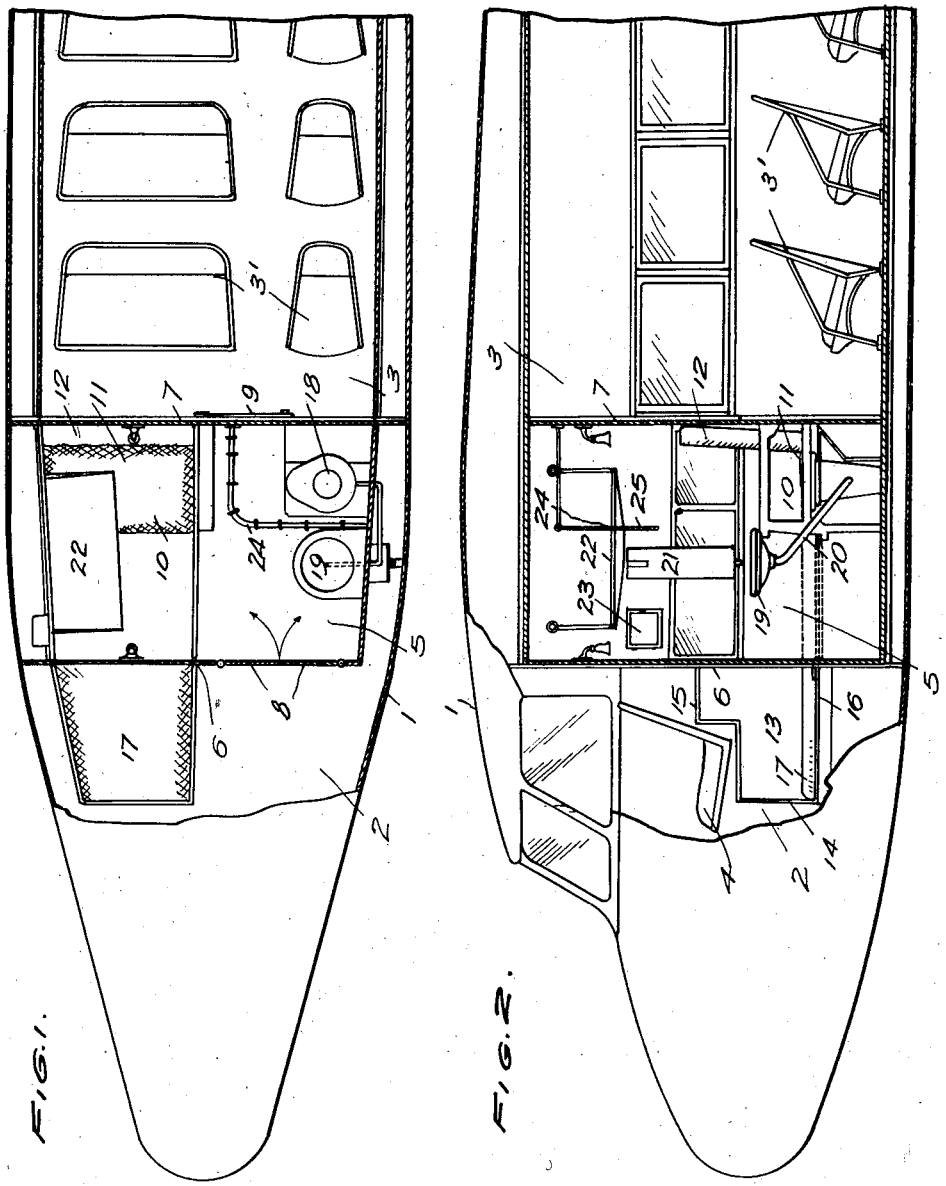

Patented Oct. 15, 1929

1,731,531

UNITED STATES PATENT OFFICE

EDGAR N. GOTT, OF BRISTOL, PENNSYLVANIA, ASSIGNOR TO KEYSTONE AIRCRAFT CORPORATION, OF BRISTOL, PENNSYLVANIA, A CORPORATION OF DELAWARE

AIRCRAFT

Application filed November 14, 1928. Serial No. 319,422.

This invention relates to aircraft, but more particularly to a private compartment therein, and the invention has for its object a construction which provides for a private compartment between the pilot's cock-pit and the passenger compartment of the airplane.

A further object of the invention is to arrange the private compartment so that it extends under the pilot's seat so as to utilize the space which is usually employed for storage.

Referring to the accompanying drawings:

Figure 1 is a fragmentary plan view partly in horizontal section illustrating the novel arrangement of the private compartment interposed between the pilot's cock-pit and the passenger compartment;

Figure 2 is a fragmentary elevation of the same partly in vertical section;

Figure 4:
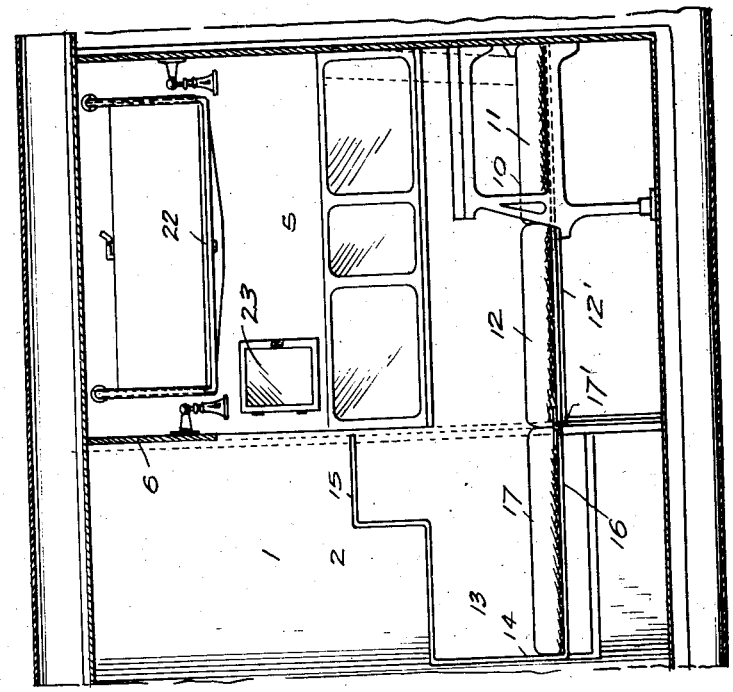
Figure 3:
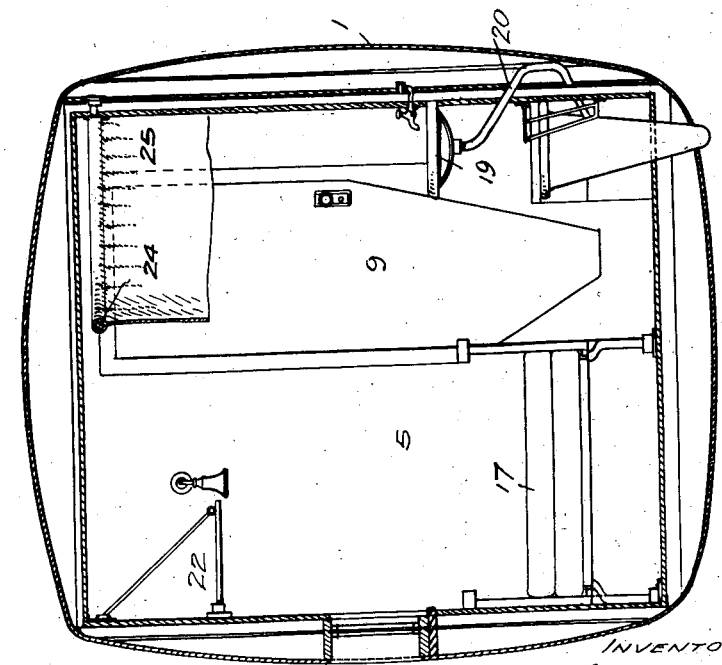

Figure 3 is an enlarged transverse vertical sectional view looking aft through the private compartment; and Figure 4 is an enlarged longitudinal sectional view through the private compartment showing the same arranged for sleeping.

Like numerals of reference indicate the same parts throughout the several figures, in which:

1 indicates the fuselage of a passenger carrying airplane, which includes the pilot compartment or cock-pit 2, and the passenger compartment 3, the former being equipped with a pilot's seat 4, and the latter with the passenger seats 3' arranged in any suitable manner, according to the size and type of the ship.

5 indicates the private compartment which is disposed between the pilot's cock-pit 2 and the regular passenger compartment 3, said private compartment 5 being defined by the two transverse bulk heads 6 and 7.

In the forward bulkhead 6, suitable doors 8 are arranged for communication between the pilot's compartment 2 and the private compartment 5, while in the aft bulkhead 7, a door 9 is arranged, in a manner which will be hereinafter more particularly described.

On one side of the private compartment 5 is a wide seat 10 preferably disposed against the aft bulkhead 7, the same having a seat cushion 11, and a removable back cushion 12.

As will appear from Figure 4 of the drawings, the forward bulkhead 6 has an opening therein in which is formed a compartment 13 (Figs. 2 and 4) which extends under the pilot's seat 4. This compartment 13 terminates in a vertical partition 14, and has its top defined by a stepped ceiling 15, while the bottom 16 of said compartment is of a height to conform to the seat of the chair 10. A cushion 17 covering said bottom 16 provides a seat directly in front of and spaced from the seat 10 as will be seen from Figures 1 and 2.

I prefer to provide the private compartment 5 with the usual toilet necessities, though it is to be understood that the extent of the fixtures will in some measure depend upon the size and type of the ship.

However, as shown in the drawings, I provide a toilet bowl 18, a lavatory 19 having its discharge pipe 20 entering the toilet bowl 18 to flush the latter. I also provide a water tank 21 to supply the lavatory, a clothes rack 22, a medicine cabinet 23, and of course contemplate augmenting the equipment by other various racks and fixtures as may be deemed necessary to the comfort and convenience of the occupants of the compartment.

As will appear from Figures 1 and 3, I provide a curtain rail 24 near the ceiling of the private compartment, so that a curtain 25 when suspended therefrom will form a toilet compartment around the toilet bowl so as to segregate the toilet bowl from the balance of the compartment.

Referring again to the door 9, it will be seen from Figure 3 that the same is so positioned with respect to the curtained toilet compartment that one may pass through the door 9 directly into the curtained toilet compartment, or may pass through the door directly into the private compartment.

Having thus described the several parts of the invention, its use and utility is obvious. However, it may be said that whenever it is desired to transform the private compartment into a sleeping compartment, the back cushion 12 of the seat 10 is placed between the seat cushion 11 and the seat cushion 17 of the compartment 13. The said cushion 12 may be supported in this intermediate position in any desired manner, as for instance by a frame 12' hinged at 17' as shown in Figure 4.

When the parts are arranged in this position they provide a comfortable sleeping berth, as will be apparent from the accompanying drawing.

Having thus fully described the invention, I do not wish to be understood as limiting the same to the exact construction herein set forth, but I consider myself clearly entitled to all such changes and alterations as fall within the limit and scope of the appended claims.

What I claim as new and desire to secure by Letters Patent of the United States, is:

1. An airship including a pilot compartment having a pilot seat, a passenger compartment having passenger seats, and a private compartment disposed between the pilot compartment and the passenger compartment, a forward bulkhead and an aft bulkhead defining the private compartment, a curtained toilet compartment in the private compartment, a door in the aft bulkhead opening into said curtained toilet compartment and into the private compartment, the forward bulkhead being provided with an opening, a compartment extending from said opening into the pilot compartment and under the said pilot seat, and combined seats and berth extending into the last mentioned compartment.

2. An airship including a pilot compartment having a pilot seat, a passenger compartment having passenger seats, and a private compartment disposed between the pilot compartment and the passenger compartment, a forward bulkhead and an aft bulkhead defining the private compartment, the forward compartment being provided with an opening, a compartment extending from said opening into the pilot compartment and under the said pilot seat and combined seats and berth extending into the last mentioned compartment.

3. An airship including a pilot compartment having a pilot seat, a passenger compartment having passenger seats, a private compartment disposed between the pilot compartment and the passenger compartment, said private compartment including a compartment extending into the pilot compartment and under the said pilot seat, and combined seats and berth extending into the last mentioned compartment.

4. An airship including a pilot compartment, a passenger compartment and a private compartment disposed between the pilot compartment and the passenger compartment, said private compartment including a compartment extending into the pilot compartment, and combined seats and berth extending into the last mentioned compartment.

In testimony whereof I affix my signature.

EDGAR N. GOTT.